(12) United States Patent
Bernard et al.

(10) Patent No.: US 11,485,834 B2
(45) Date of Patent: Nov. 1, 2022

(54) FATTY DIAMIDE ADDITIVE COMPOSITION PRECONCENTRATED AND PRE-ACTIVATED IN A REACTIVE DILUENT

(71) Applicant: Arkema France, Colombes (FR)

(72) Inventors: Michael Yves Bernard, Enghien les Bains (FR); Carine Fouilliart, Le Meux (FR); Vincent F. Leroy, Fitz James (FR); Thierry Soula, Liancourt (FR)

(73) Assignee: Arkema France, Colombes (FR)

( * ) Notice: Subject to any disclaimer, the term of this patent is extended or adjusted under 35 U.S.C. 154(b) by 334 days.

(21) Appl. No.: 15/770,514

(22) PCT Filed: Oct. 25, 2016

(86) PCT No.: PCT/FR2016/052772
§ 371 (c)(1),
(2) Date: Apr. 24, 2018

(87) PCT Pub. No.: WO2017/077220
PCT Pub. Date: May 11, 2017

(65) Prior Publication Data
US 2018/0223076 A1 Aug. 9, 2018

(30) Foreign Application Priority Data
Nov. 2, 2015 (FR) ...................... 1560470

(51) Int. Cl.
| | |
|---|---|
| *C08K 5/20* | (2006.01) |
| *C09D 163/00* | (2006.01) |
| *C08K 5/101* | (2006.01) |
| *C08J 3/24* | (2006.01) |
| *C09D 7/00* | (2018.01) |
| *C09D 11/101* | (2014.01) |
| *C08F 2/44* | (2006.01) |
| *C09J 163/00* | (2006.01) |
| *C09D 7/20* | (2018.01) |
| *C09D 7/43* | (2018.01) |
| *C09D 7/80* | (2018.01) |
| *C08J 3/22* | (2006.01) |
| *C09D 4/06* | (2006.01) |
| *C09D 7/63* | (2018.01) |
| *C08F 20/28* | (2006.01) |
| *C08L 33/06* | (2006.01) |
| *C08L 63/00* | (2006.01) |
| *C09D 11/102* | (2014.01) |
| *C09D 11/38* | (2014.01) |
| *C09D 133/06* | (2006.01) |

(Continued)

(52) U.S. Cl.
CPC ............... *C08K 5/20* (2013.01); *C08F 20/28* (2013.01); *C08J 3/223* (2013.01); *C08J 3/24* (2013.01); *C08K 5/101* (2013.01); *C08L 33/06* (2013.01); *C08L 63/00* (2013.01); *C09D 4/06* (2013.01); *C09D 7/20* (2018.01); *C09D 7/43* (2018.01); *C09D 7/63* (2018.01); *C09D 7/80* (2018.01); *C09D 11/101* (2013.01); *C09D 11/102* (2013.01); *C09D 11/38* (2013.01); *C09D 133/06* (2013.01); *C09D 133/14* (2013.01); *C09D 163/00* (2013.01); *C09J 11/06* (2013.01); *C09J 133/06* (2013.01); *C09J 133/14* (2013.01); *C09J 163/00* (2013.01); *C08F 2/44* (2013.01); *C08F 2/50* (2013.01); *C08J 2333/06* (2013.01); *C08J 2333/14* (2013.01); *C08J 2363/00* (2013.01); *C08J 2433/14* (2013.01); *C08J 2435/02* (2013.01); *C08L 2205/025* (2013.01)

(58) Field of Classification Search
CPC .. C08K 5/20; C08K 5/101; C08J 3/223; C08J 3/24; C08J 2333/06; C08J 2333/14; C08J 2363/00; C08J 2433/14; C08J 2435/02; C09D 4/06; C09D 7/63; C09D 11/101; C09D 11/102; C09D 11/38; C09D 133/06; C09D 133/14; C09D 7/20; C09D 7/43; C09D 7/80; C09D 163/00; C08F 20/28; C08F 2/44; C08F 2/50
See application file for complete search history.

(56) References Cited

U.S. PATENT DOCUMENTS 6,239,189 B1 * 5/2001 Narayan ................. C07C 69/54
522/101
7,858,074 B2 12/2010 Caron et al.
(Continued)

FOREIGN PATENT DOCUMENTS

| EP | 1 935 934 B1 | 7/2012 | | |
|---|---|---|---|---|
| JP | 2002 146336 | 5/2002 | | |
| WO | WO 2014/016517 | * | 1/2014 | ........... C07C 235/06 |

*Primary Examiner* — Jessica M Roswell
(74) *Attorney, Agent, or Firm* — Lynn B. Morreale

(57) ABSTRACT

The invention relates to a fatty acid diamide-based rheology additive composition, which is pre-activated and pre-concentrated in fatty acid diamide, comprising: a) from 5% to 30% by weight of at least one fatty acid diamide based on 12 hydroxystearic acid and on a linear, in particular C5, C6 or C7, aliphatic diamine, b) from 70% to 95% by weight of at least one monofunctional (meth)acrylic reactive diluent comprising a cycloaliphatic group or several cycloaliphatic groups, the % being expressed relative to a)+b). It also relates to a process for preparing the composition and to the use thereof as a rheology additive in reactive binder compositions such as coating, moulding, composite material, anchor bolt or sealant compositions or photocrosslinkable compositions for stereolithography or for 3D printing of objects by inkjet.

17 Claims, No Drawings

(51) Int. Cl.
*C09D 133/14* (2006.01)
*C09J 11/06* (2006.01)
*C09J 133/06* (2006.01)
*C09J 133/14* (2006.01)
*C08F 2/50* (2006.01)

(56) References Cited

U.S. PATENT DOCUMENTS

| | | | | |
|---|---|---|---|---|
| 2003/0050390 A1* | 3/2003 | Weikard | ............. | C08F 290/067 |
| | | | | 524/589 |
| 2003/0092789 A1* | 5/2003 | Jin | ............. | C08K 3/22 |
| | | | | 522/81 |
| 2008/0260959 A1* | 10/2008 | Gonzalez | ............. | C23F 11/167 |
| | | | | 427/487 |
| 2016/0312005 A1* | 10/2016 | Bernard | ............. | C07C 235/06 |

\* cited by examiner

FATTY DIAMIDE ADDITIVE COMPOSITION PRECONCENTRATED AND PRE-ACTIVATED IN A REACTIVE DILUENT

CROSS-REFERENCE TO RELATED APPLICATIONS

This application is a national stage application under 35 U.S.C. § 371 of PCT/FR2016/052772, filed Oct. 25, 2016 which claims benefit to application FR15.60470, filed Nov. 2, 2015.

The present invention relates to a novel specific rheology additive which is an already pre-activated fatty acid diamide-based composition, in particular in the form of a gel or a paste, which is pre-concentrated in fatty acid diamide and comprises a micronized fatty acid diamide based on 12-hydroxystearic acid (12-HSA) and on a linear aliphatic diamine and a monofunctional (meth)acrylic reactive diluent. The invention also relates to a preparation process, to a reactive-binder composition containing said specific additive and to the use thereof in reactive compositions of reactive binder for immediate use and without the need for reactivation of said fatty diamide additive. The use of this specific additive therefore specifically targets reactive compositions of reactive binder, for instance coating compositions such paints, varnishes, gel coats or inks, or mastic, glue, adhesive or moulding compositions, composite material compositions, chemical anchor bolt compositions, sealant compositions or photocrosslinkable compositions for stereolithography or for 3D printing of objects, in particular by inkjet.

The activation of a rheology additive such as a fatty acid diamide consists, after homogeneous dispersion in the form of a micronized powder of said diamide in a diluent or a plasticizer suitable for the diamide and for the final use or application, in maintaining said dispersion under isothermal conditions at a given temperature, which depends on the diamide and on the diluent, for a sufficient period of time until there is an increase in its viscosity and stabilization and obtaining of a physical gel.

The gel thus activated (also called activated paste) can be characterized firstly by means of a quite simple test using a wooden spatula introduced into the gel or the paste to be tested and which remains vertical without moving, if the tested product is sufficiently activated with said rheological gel or paste remaining single-phase, and never exudes the reactive diluent.

More particularly, said activated gel or paste can be characterized by the penetration depth with a penetrometer according to standard ASTM D 217 or by measuring the dynamic elastic modulus of the gel obtained. The typical values of an activated gel, in terms of penetration according to standard ASTM D 217, are less than 15 mm or a dynamic elastic modulus E' at 23° C. and at 1 Hz of at least $10^4$ Pa.

Commercial pastes of rheology additives, pre-activated in inert solvents such as xylene, optionally in a mixture of solvents with an alcohol or in vinyl acetate or in white spirit, already exist. However, these inert solvents are flammable with emission of vapours (volatile organic compounds known as VOCs) into the atmosphere. The use of such a pre-activated additive will have, in addition to the effect of these flammable VOC emissions, as additional effect in a reactive composition of reactive binder, a negative effect on the final mechanical performance levels due to an effect of plasticization of the final object or coating obtained.

EP 1 935 934 describes pre-activated and pre-concentrated compositions of fatty acid diamide additive in a liquid plasticizer. This system has the same drawback as that already mentioned above regarding the negative plasticization on the mechanical performance levels of the coatings or objects obtained with reactive compositions based on reactive binders. Furthermore, there is a problem with compatibility of the plasticizer with the reactive components of a reactive binder composition. Since said plasticizer is inert and is not compatible with the reactive system, it has a tendency to at least partially migrate to the surface of the coatings or objects obtained, with the creation of problems of adhesion at the surface of the final object or coating obtained.

An additional problem encountered with reactive compositions based on one-component or two-component reactive binders is the fact that, during the activation of the fatty acid diamide additive, the risk of premature reaction of the reactive components during the activation of said diamide in situ in the final formulation, before polymerization and in particular crosslinking reaction, must be avoided.

In order to overcome all these drawbacks, the present invention proposes the use of a rheology additive in the form of a pre-activated composition which is pre-concentrated in fatty acid diamide using as diluent a reactive diluent which participates in the reaction of said reactive composition, said diluent being a monofunctional (meth)acrylate monomer. As a result, said diluent is chemically integrated into the final product and does not plasticize the final product, nor can it migrate to the surface of the final object or coating obtained, this while using a low amount of said pre-concentrated and already pre-activated additive without any need for activation of said additive in the reactive composition containing the reactive components of the reactive binder and thus avoiding any risk of premature polymerization, in particular crosslinking, of said final reactive composition. Thus, said reactive composition of reactive binder or final application formulation can have the desired degree of thixotropy by simple dilution of said pre-activated, pre-concentrated additive and can be used immediately (subjected to the reaction) without prior need of a suitable long in situ activation step and therefore without the risk of any premature reaction.

Another advantage of this solution is the possibility of using this pre-activated and pre-concentrated additive, in particular in the form of a pre-activated gel or paste, both in reactive systems by the radical route, whether under radiation or thermally or by an initiation system based on peroxide or hydroperoxide or by reaction with reactive amino components where said diluent is a monoacrylate by Michael addition reaction, for instance in the case of an epoxyamine two-component reactive binder.

The present invention relates firstly to the pre-activated and pre-concentrated composition of fatty acid diamide in said reactive diluent, which composition can be in the form of a pre-activated paste or gel.

Another subject relates to a process for preparing said additive.

The invention also relates to a reactive composition or formulation of reactive binder comprising said additive as rheology additive, in particular as thixotropic additive.

Finally, the invention relates to the use of said additive as defined according to the invention as rheology additive for reactive binder compositions, for immediate use and without the need for additional activation of said additive in situ.

The first subject of the invention is therefore a fatty acid diamide-based rheology additive composition which is already pre-activated and pre-concentrated in fatty acid diamide and which comprises:

a) from 5% to 30% by weight of at least one fatty acid diamide based on 12-hydroxystearic acid and on a linear aliphatic diamine, which is in particular $C_5$, $C_6$ or $C_7$, b) from 70% to 95% by weight of at least one monofunctional (meth)acrylic reactive diluent comprising a cycloaliphatic group or several cycloaliphatic groups, said cycloaliphatic groups possibly being substituted with at least one $C_1$ to $C_4$ alkyl, the % being expressed relative to a)+b).

In the case of the reactive diluent b), said cycloaliphatic group is a cyclic group with said ring being formed exclusively by carbon atoms.

The fatty acid diamide based on 12-hydroxystearic acid and on a linear aliphatic diamine means that it is obtained by condensation of 12-HSA with said diamine. Since the purity of commercial 12-HSA can vary from 85% to 100%, it is possible (if not at 100%) that, in addition to the 12-HSA, there are other residual $C_{18}$ fatty acids, in particular predominantly (more than 85% of the residual $C_{18}$ acids) stearic acid.

Preferably, in the composition of the additive according to the invention, said diamine is a $C_6$ linear aliphatic diamine. More particularly, said diamine is 1,6-hexamethylenediamine.

Said diamide, after synthesis and recovery of the solid diamide, is micronized by mechanical grinding or by air jet, preferably to obtain a volume-average size of less than 15 μm, more preferentially of less than 10 μm. Said size can be determined by laser diffraction. More particularly, said diamide a) is present in a content by weight ranging from 10% to 25% and said diluent b) is present in a content by weight ranging from 75% to 90% relative to a)+b).

The monofunctional (meth)acrylic monomer reactive diluent b) is preferably chosen from: dicyclopentadienyl (meth)acrylate, norbornyl (meth)acrylate, isobornyl (meth)acrylate (IBO(M)A), tert-butyl cyclohexanol (meth)acrylate (TBCH(M)A), tricyclodecanediol mono(meth)acrylate or 3,3,5-trimethylcyclohexanol (meth)acrylate (TMCH(M)A).

According to one particular option, said monofunctional (meth)acrylic monomer reactive diluent b) is a monoacrylate. The corresponding type of additive is suitable in particular as an additive for reactive compositions of a reactive binder based on an epoxyamine two-component reactive system, with reaction of said reactive diluent monoacrylate b) with the amine (curing agent) of the epoxyamine system.

Preferably, said additive composition comprises, in addition to a) and b), a radical polymerization-inhibiting stabilizer in a content by weight relative to a)+b) ranging from 10 to 1000 ppm, preferably from 20 to 300 ppm.

The second subject of the invention relates to a process for preparing the diamide additive composition as defined according to the invention above, which comprises the following successive steps:

i) gradual dispersion of said diamide a) in the form of a micronized powder, in said diluent b) until a homogeneous dispersion is obtained, at ambient temperature (i.e. ranging from 5 to 25° C.) controlled using temperature regulation, ii) maintaining of the homogeneous dispersion obtained during step i) in at least one set of stationary heating conditions ranging from 80 to 100° C., for a period of time of from 1 to 100 hours, preferably from 10 to 100 hours, and without any polymerization of said diluent b).

The term "ambient temperature" means a temperature ranging from 5 to 25° C.

The regulation of this temperature is carried out by means of a system of regulation by cooling so as to avoid the heating created by the shear during the dispersion of the micronized powder and to avoid premature and uncontrolled activation before step ii) where the conditions are perfectly controlled under isothermal conditions ranging from 80 to 100° C.

More particularly, at the end of step ii), the maximum penetration value of the paste formed is less than 15 mm, preferably less than 10 mm, measured according to standard ASTM D 217 with the following conditions: temperature of 23° C., cone of 30 degrees, test speed of 5 mm/s with penetration force of 0.4 N.

In fact, at the end of step ii), the consistency of the homogeneous gel or paste of the additive composition reaches a plateau value without significantly changing thereafter.

Another subject of the invention relates to a reactive-binder composition, which comprises, as rheology additive, at least one composition as defined above according to the invention or as obtained by means of the process as defined above according to the invention.

More particularly, said reactive composition of reactive binder is a polymerizable, in particular crosslinkable, composition selected from coating compositions, in particular from varnishes, coatings, gel coats, paints and inks or from adhesive or glue compositions or from moulding compositions, composite material compositions, mastic compositions, chemical anchor bolt compositions and sealant compositions or from photocrosslinkable compositions for stereolithography or for 3D printing of objects, in particular by inkjet.

It may be polymerizable and in particular crosslinkable by the radical route, or under radiation, or by an initiating system based on peroxide or hydroperoxide.

With a composition which is polymerizable, in particular crosslinkable, under UV radiation, a photoinitiator is present. Under an electron beam, there is no need for a photoinitiator.

In the case of the use of a peroxide or hydroperoxide initiator, a decomposition accelerator can be used. In particular, in the case of a hydroperoxide and of a decomposition accelerator which is a reducing agent, the polymerization and in particular the crosslinking can be carried out at low temperature.

Even more particularly, said reactive-binder composition is polymerizable, in particular crosslinkable, under radiation selected from UV, laser, LED, and electron beam, and preferably UV.

According to one more particular option, said monofunctional (meth)acrylic reactive diluent b) is a monoacrylate in said pre-activated additive composition. In this particular case, the reactive composition of binder is polymerizable, in particular crosslinkable, by means of a Michael addition reaction with an amine, in particular polyamine. Preferably, the reactive composition is crosslinkable and comprises a two-component system based on epoxy resin and on an amine, in particular polyamine, curing agent.

According to another particular option, said reactive composition of reactive binder comprises, as reactive diluent of said binder composition, at least one acrylic oligomer and/or at least one acrylic monomer (meaning acrylic or methacrylic) and preferably at least one multifunctional acrylic oligomer and/or at least one multifunctional acrylic monomer.

According to one particular possibility of said reactive binder composition, said reactive diluent of the binder composition is an acrylic or methacrylic monomer which may be identical to or different from the monofunctional (meth)acrylic monomer used as reactive diluent according to b) in the composition of said diamide additive.

The content by weight of said additive composition used as rheology additive, as defined above according to the invention, ranges from 0.5% to 10% by weight relative to said reactive composition of reactive binder.

The final subject of the invention relates to the use of an additive composition as defined above according to the invention or obtained by means of a process as defined according to the invention, as rheology additive for reactive compositions of binder for immediate use and without any need for additional activation of said additive in situ.

The following examples are given by way of illustration of the present invention and of its performance levels and do not in any way limit its scope.

Experimental Section

I—Starting Materials Used

TABLE 1

Starting materials used

| Product | Function | Commercial reference | Supplier |
|---|---|---|---|
| 12-Hydroxystearic acid | Acid vs diamide | 12-HSA | Jayant Agro |
| Hexamethylenediamine | Amine vs diamide | 98% hexamethylene-diamine | Aldrich |
| Epoxy resin | Reactive binder | DER ®-324 | Dow |
| 3,3,5-Trimethyl cyclohexanol acrylate (TMCHA) | Reactive diluent vs additive | SR420 | Sartomer |
| Cyclic trimethylol-propane formal acrylate (CTFA) | Reactive diluent vs additive | SR531 | Sartomer |
| Trimethylolpropane triacrylate (TMPTA) | Reactive diluent vs additive | SR351 | Sartomer |
| 2-Phenoxyethyl acrylate (2-PEA) | Reactive diluent vs additive | SR339C | Sartomer |
| Acrylate oligomer | Reactive binder | CN203 | Sartomer |
| Propoxylated (3) glyceryl triacrylate (GPTA) | Reactive diluent of binder composition | SR9020 | Sartomer |
| Additive | Defoaming agent | BYK ® A530 | Byk-Chemie |
| Titanium dioxide | Filler | Tiona RCL 595 | Cristal |
| Zinc phosphate | Filler | ZP 10 | Heubach |
| Talc | Filler | Micro Talc AT1 | Mondo Minerals |
| Preactivated fatty diamide paste in xylene | Rheology additive | Crayvallac ® PA4X20 | Arkema |

II—Methods and Tests Used

The rheological behaviour of the compositions comprising at least one additive according to the present invention was characterized according to the following tests:

1) Consistency

The consistency of the paste is measured using a texturing device, according to standard ASTM D 217. The standard refers to a standardized manual measuring device and has been reproduced by a TA-XT2i texture analyzer manufactured by Thermorheo (supplier: Swantech). The principle of the standard has been automated on the TA-XT2i from Stable Micro Systems.

1) A. Principle

A suitable cone as described in standard ASTM D 217 is used, with a given force in order to provide a value for penetration into the paste. This measurement "of indentation" is expressed in millimetres (mm).

The resistance to penetration increases with the consistency and the penetration value decreases with this consistency.

1) b. Equipment

The equipment used is as follows:
an automatic texture analyzer: TA-XT2i,
a cone, the applied force of which is equivalent to its weight of 47.5 g, with a needle forming an angle of 30°,
penetration force: 0.4 N
test speed: 5 mm/s.

1) c. Conditioning of the Products

The products to be tested have to be conditioned in a climate-controlled laboratory, under respective temperature and relative humidity conditions of 23° C. and 50% RH, for a period of time of 24 hours at least before the beginning of the test.

1) d. Preparation of the Products

The products are packaged after synthesis in 1 litre metal canisters (height: 13 cm, diameter 11 cm).

The texture measurement is carried out after the maturing stage and before the samples are used.

1) e. Procedure

The test is carried out at the temperature of the climate-controlled laboratory. Three tests are carried out on a container.

The sample is placed under the cone and the tip of the needle is placed at the surface of the paste.

The program on the TA-XT2i is subsequently started and the penetration is triggered.

The value of the displacement of the needle into the paste is then recorded.

The results are expressed in millimetres (mm).

2) Flow Resistance or Sagging Resistance Test

2) A. principle

This method is specific to the determination of the maximum thickness at which the coating can be applied without observing any sagging phenomenon due to gravity.

The term sagging resistance is used and it is expressed in µm.

2) b. Device

The test is carried out using a sagging tester (Levelling/Sagging Tester from Sheen Instruments®). Manufactured from stainless steel and having a straight blade, this tester comprises notches of increasing values which make it possible to simultaneously apply layers of different thicknesses.

The layers are applied to a black paper support having the reference: byko-chart Scrub-test P121-10N, black.

2) c. Conditioning of the Products

Regardless of the formulations, the products to be tested are conditioned for 24 h in a climate-controlled laboratory at 23'C and 50% RH before the beginning of the test.

2) d. Procedure

The test is carried out at the temperature of the climate-controlled laboratory (23° C. and 50% RH).

The test consists in depositing parallel strips of paint of different thicknesses on the support using the sagging tester.

The support is immediately placed in the vertical position, with the thinnest film on the top. The thickness at which the strips meet indicates the first thickness at which the sagging phenomenon due to gravity is observed.

The sagging resistance performance is the maximum thickness at which no sagging is observed (the strips do not meet).

It Is expressed in μm.

3) Viscosity

After conditioning of the formulations (cf. 2) c), the Brookfield® viscosity at 23° C. and 50% RH is evaluated using a Brookfield® DVI prime—RV viscometer, at 5 different speeds: 1 rpm, 5 rpm, 10 rpm, 50 rpm, 100 rpm (revolutions per minute).

The viscosity is first measured at the slowest speed and the operation is repeated with the speed being varied in an increasing manner.

The Brookfield® viscosity is expressed in mPa·s.

III—Preparation and Characterization of the Rheology Additives

1) Preparation of the Rheology Additive According to the Invention and Comparative Additives Preparation of the Fatty Acid Diamide 49.96 grams of hexamethylenediamine (i.e. 0.43 mol, 0.86 amine equivalent), and 271.10 grams of 12-hydroxystearic acid (i.e. 0.86 mol, 0.86 carboxy equivalent) are introduced, in a nitrogen atmosphere, into a 1 litre round-bottomed flask equipped with a thermometer, a Dean-Stark apparatus, a condenser and a stirrer.

The mixture is heated to 200'C always under a nitrogen stream. The water removed begins to accumulate in the Dean Stark apparatus starting from 150° C. The reaction is controlled by the acid number and amine number. When the acid and amine values (numbers) are less than 10 mg KOH/g, the reaction mixture is cooled to 150° C., then discharged into a silicone mould. Once cooled to ambient temperature, the product is mechanically micronized by milling and sieving so as to obtain a fine and controlled particle size with an average size obtained of 7 μm.

EXAMPLE 1 (INVENTION): PREPARATION OF THE PRE-ACTIVATED PASTE AT 15% IN 3,3,5-TRIMETHYL-CYCLOHEXANOL ACRYLATE (TMCHA)

150 g of the previously milled fatty acid diamide as prepared above and 850 g of acrylate monomer are charged to a 1 litre metal canister (height: 13 cm, diameter: 11 cm), at ambient temperature. Using a Dispermat® CV disperser fitted with a paddle 4 cm in diameter, the 2 products are mixed at 1500 rpm for 15 min, at a temperature not exceeding 20° C., by regulating the temperature by cold water circulation. The canister is then carefully closed again and placed in an oven preheated beforehand to 90° C., for 24 hours.

The final product is a soft white paste characterized by a content of dry active material of 15% and a penetration resistance measured according to standard ASTM D 217 of 3.00 mm.

EXAMPLE 2 (INVENTION): PREPARATION OF THE PRE-ACTIVATED PASTE CONTAINING 20% OF DIAMIDE, IN 3,3,5-TRIMETHYL CYCLOHEXANOL ACRYLATE (TMCHA)

200 g of the previously milled fatty acid diamide as described above and 800 g of acrylate monomer are charged to a 1 litre metal canister (height: 13 cm, diameter: 11 cm), at ambient temperature. Using a Dispermat® CV disperser fitted with a paddle 4 cm in diameter, the 2 products are mixed at 1500 rpm for 15 min, at a temperature not exceeding 20° C., by regulation of the temperature by cold water circulation. The canister is then carefully closed again and placed in an oven preheated beforehand to 90° C., for 24 hours.

The final product is a soft white paste characterized by a content of dry active material of 20% and a penetration resistance measured according to standard ASTM D 217 of 3.00 mm.

EXAMPLE 3 (COMPARATIVE): PREPARATION OF THE PRE-ACTIVATED PASTE IN CYCLIC TRIMETHYLOLPROPANE FORMAL ACRYLATE (CTFA)

150 g of the previously milled fatty acid diamide as described above and 850 g of acrylate monomer are charged to a 1 litre metal canister (height: 13 cm, diameter 11 cm), at ambient temperature. Using a Dispermat® CV disperser fitted with a paddle 4 cm in diameter, the 2 products are mixed at 1500 rpm for 15 min, at a temperature not exceeding 20° C., by regulation of the temperature by cold water circulation. The canister is then carefully closed again and placed in an oven preheated beforehand to 90° C., for 24 hours.

The final product is a soft white paste characterized by a content of dry active material of 15%.

EXAMPLE 4 (COMPARATIVE): PREPARATION OF THE PRE-ACTIVATED PASTE IN TRIMETHYLOLPROPANE TRIACRYLATE (TMPTA)

150 g of the previously milled fatty acid diamide as described above and 850 g of acrylate monomer are charged to a 1 litre metal canister (height: 13 cm, diameter: 11 cm), at ambient temperature. Using a Dispermat® CV disperser fitted with a paddle 4 cm in diameter, the 2 products are mixed at 1500 rpm for 15 min, at a temperature not exceeding 20° C., by regulation of the temperature by cold water circulation. The canister is then carefully closed again and placed in an oven preheated beforehand to 90° C., for 24 hours.

The final product is a soft white paste characterized by a content of dry active material of 15%.

EXAMPLE 5 (COMPARATIVE): PREPARATION OF THE PRE-ACTIVATED PASTE IN 2-PHENOXYETHYL ACRYLATE (2-PEA)

150 g of the previously milled fatty acid diamide as described above and 850 g of acrylate monomer are charged to a 1 litre metal canister (height: 13 cm, diameter: 11 cm), at ambient temperature. Using a Dispermat® CV disperser fitted with a paddle 4 cm in diameter, the 2 products are mixed at 1500 rpm for 15 min, at a temperature not exceeding 20° C., by regulation of the temperature by cold water circulation. The canister is then carefully closed again and placed in an oven preheated beforehand to 90° C., for 24 hours.

The final product is a soft white paste characterized by a content of dry active material of 15%.

2) Characterization of the Rheology Additive According to the Invention and Comparative Additives The rheology additive in the form of a pre-activated paste is used in the preparation of photocrosslinkable coating formulations and of 2-component formulations without solvent.

Use of the Theology Additives for Photocrosslinkable Formulations

Production of the Coating Formulations

The coating formulations are produced in the laboratory with a high-speed disperser of Dispermat® AE type, equipped with a deflocculator.

The acrylate oligomer resin (CN203) and the reactive diluent (monomer of the formulation of reactive binder) propoxylated(3) glyceryl triacrylate, i.e. bearing 3 propoxy units per molecule (GPTA-SR 9020) are mixed at 1000 rpm, at a tangential speed of 2 m/s for 5 min.

The rheology additive is then added and dispersed at 1500 rpm for 20 min.

The crosslinking reaction between the oligomer and the reactive diluent takes place by action of UV radiation during the passage under a UV lamp, by means of initiators contained in said photocrosslinkable coating formulation.

The characterization tests are carried out within 24 hours following the preparation of the formulations after conditioning at 23° C. and 50% RH.

Six simplified formulae of crosslinkable coating compositions were prepared:

Example 6: formula without additive.
Example 7: formula with the additive Crayvallac® PA4X20 (20% of active material in xylene—non-reactive solvent).
Example 8: formula with additive described in Example 1 (15% of active material in a monofunctional reactive diluent comprising a cycloaliphatic structure according to the invention).
Example 9: formula with additive described in Example 2 (20% of active material in a monofunctional reactive diluent comprising a cycloaliphatic structure according to the invention).
Example 10: formula with additive described in Example 3 (15% of active material in a heterocyclic monofunctional reactive diluent, comparative).
Example 11: formula with additive described in Example 4 (15% of active material in a trifunctional reactive diluent, comparative).
Example 12: formula with additive described in Example 5 (15% of active material in an aromatic monofunctional reactive diluent, comparative).

The 6 examples were prepared according to the following formulae (see table 2):

TABLE 2

| Starting material reference | Nature | Ex. 6 | Ex. 7 | Ex. 8 | Ex. 9 | Ex. 10 | Ex. 11 | Ex. 12 |
|---|---|---|---|---|---|---|---|---|
| CN 203 | Acrylate oligomer | 65 | 61.75 | 61.75 | 62.55 | 61.75 | 61.75 | 61.75 |
| SR 9020 | Reactive diluent of the formulation (in reactive-binder composition) | 35 | 33.25 | 33.25 | 33.7 | 33.25 | 33.25 | 33.25 |
| Crayvallac ® PA4X20 | Pre-activated diamide paste | | 5 | | | | | |
| Additive of Ex. 1 (invention) | Pre-activated diamide paste | | | 5 | 3.75 | | | |
| Additive of Ex. 2 (invention) | Pre-activated diamide paste | | | | | | | |
| Additive of Ex. 3 (comparative) | Pre-activated diamide paste | | | | | 5 | | |
| Additive of Ex. 4 (comparative) | Pre-activated diamide paste | | | | | | 5 | |
| Additive of Ex. 5 (comparative) | Pre-activated diamide paste | | | | | | | 5 |
| Total | | 100 | 100 | 100 | 100 | 100 | 100 | 100 |

TABLE 3

| | | Viscosity (mPa · s) | | | | | Sagging resistance |
|---|---|---|---|---|---|---|---|
| Example | Rheology additive | 1 rpm | 5 rpm | 10 rpm | 50 rpm | 100 rpm | (μm) |
| Ex. 6 | Without additive | 4000 | 3800 | 3780 | 3730 | 3200 | 50 |
| Ex. 7 | Crayvallac ® PA4X20 | 128000 | 37000 | 22300 | 7820 | 5300 | 1000 |
| Ex. 8 | Additive of Ex. 1 | 70000 | 22000 | 14000 | 6200 | 4800 | 1075 |
| Ex. 9 | Additive of Ex. 2 | 88000 | 28000 | 18300 | 7700 | 5550 | 1500 |

TABLE 3-continued

| Example | Rheology additive | Viscosity (mPa · s) | | | | | Sagging resistance (μm) |
| --- | --- | --- | --- | --- | --- | --- | --- |
| | | 1 rpm | 5 rpm | 10 rpm | 50 rpm | 100 rpm | |
| Ex. 10 | Additive of Ex. 3 | 22800 | 8960 | 6400 | 3500 | 2870 | 350 |
| Ex. 11 | Additive of Ex. 4 | 3600 | 3000 | 2780 | 2340 | 2200 | 70 |
| Ex. 12 | Additive of Ex. 5 | 7600 | 5200 | 4180 | 2700 | 2300 | 70/100 |

Use of the Rheology Additives for the Epoxy Formulations without Solvent

Production of the Coating Formulations

The coating formulations are produced in the laboratory in 2 steps.

The first consists in formulating a mixture called "part A", which is a dispersion of the fillers in the epoxy resin. The rheology additive is also added to part A. The 2nd step is the addition, to this part A, of an amino curing agent, called "part B", in ratios calculated to adjust the crosslinking reactivity.

The reaction for crosslinking of the coating is provided by reaction of part A containing the epoxy resin with part B containing the amino curing agent.

In the laboratory, part A is produced with a high-speed disperser of Dispermat AE type, equipped with a deflocculator.

The epoxy resin—DER 324, the fillers (titanium dioxide, zinc phosphate, talc) and the defoaming agent are mixed at 3000 rpm, at a tangential speed of 6 m/s for 30 min.

The rheology additive is then added to this part A and dispersed at 1500 rpm for 20 min.

After standing for 24 h, part B is mixed with part A at 1500 rpm for 2 min.

The characterization tests are then carried out in the 30 min that follow.

Three epoxy coating formulae without solvent and comprising two components (epoxy/amine) were prepared:
Example 13: formula without additive.
Example 14: formula with additive described in Example 1.
Example 15: formula with additive described in Example 2.

TABLE 4

| | Starting material reference | Nature | Ex. 13 | Ex. 14 | Ex. 15 |
| --- | --- | --- | --- | --- | --- |
| Part A | DER ® 324 | Epoxy resin | 55.6 | 55.6 | 55.6 |
| | BYK ® A530 | Defoaming agent | 0.3 | 0.3 | 0.3 |
| | Tiona RCL 595 | Titanium dioxide | 19.1 | 19.1 | 19.1 |
| | ZP 10 | Zinc phosphate | 7.3 | 7.3 | 7.3 |
| | Microtalc AT1 | Talc | 11.4 | 11.4 | 11.4 |
| | SR 420 | Reactive diluent (as monomer diluent of the formulation) | 5.6 (*) | | |
| | Additive of example 1 | Pre-activated diamide paste | | 6.3 | |
| | Additive of example 2 | Pre-activated diamide paste | | | 6.3 |
| | Total | | 99.3 | 100 | 100 |
| Part B | Epikure ® F205 | Amine | 32 | 32 | 32 |
| | Total | | 132 | 132 | 132 |

(*) The formulation of Comparative Example 13 comprises 5.6 parts of monomer reactive diluent so as to be under conditions strictly comparable to Examples 14 and 15.

Results

TABLE 5

| Example | Rheology additive | Viscosity (mPa · s) | | | | | Sagging resistance (μm) |
| --- | --- | --- | --- | --- | --- | --- | --- |
| | | 1 rpm | 5 rpm | 10 rpm | 50 rpm | 100 rpm | |
| Ex. 13 | Without additive | 1600 | 1920 | 1760 | 1790 | 1744 | 100 |
| Ex. 14 | Additive of Ex. 1 | 67200 | 20800 | 13140 | 5536 | 4000 | 1100 |
| Ex. 15 | Additive of Ex. 2 | 91200 | 27840 | 17600 | 6720 | 4830 | 1500 |

The invention claimed is:

1. A fatty acid diamide-based thixotropic rheology additive composition, already pre-activated and pre-concentrated in fatty acid diamide, comprising:
   a) from 5% to 3.0% by weight of at least one fatty acid diamide based on 12-hydroxystearic acid and on a linear $C_5$, $C_6$ or $C_7$ aliphatic diamine,
   b) from 70% to 95% by weight of at least one monofunctional (meth)acrylic reactive diluent comprising a cycloaliphatic group or more than one cycloaliphatic groups, said cycloaliphatic groups optionally being substituted with at least one $C_1$ to $C_4$ alkyl,
   the % being expressed relative to a)+b), wherein the pre-activated, pre-concentrated fatty acid diamide-based thixotropic rheology additive composition is a gel or paste obtained by pre-activating and pre-concentrating the at least one fatty acid diamide in the presence of the at least one monofunctional (meth)acrylic reactive diluent.

2. The composition according to claim 1, wherein said diamine is a $C_6$ linear aliphatic diamine.

3. The composition according to claim 1 wherein said diamide is present in a content by weight ranging from 10% to 25% and said diluent b) is present in a content by weight ranging from 75% to 90% relative to a)+b).

4. The composition according to claim 1 wherein said monofunctional (meth)acrylic monomer reactive diluent b) is chosen from the group consisting of: dicyclopentadienyl (meth)acrylate, norbornyl (meth)acrylate, isobornyl (meth) acrylate (IBO(M)A), tert-butyl cyclohexanol (meth)acrylate (TBCH(M)A), tricyclodecanediol mono(meth)acrylate and 3,3,5-trimethyl cyclohexanol (meth)acrylate (TMCH(M)A).

5. The composition according to claim 1 wherein said monofunctional (meth)acrylic monomer reactive diluent b) is a monoacrylate.

6. The composition according to claim 1 comprising, in addition to a) and b), a radical polymerization-inhibiting stabilizer at a content by weight relative to a)+b) ranging from 10 to 1000 ppm.

7. A process for preparing the diamide additive composition according to claim 1 comprising the following successive steps:
   i) gradual dispersion of said diamide a) in the form of a micronized powder, in said diluent b) until a homogeneous dispersion is obtained, at ambient temperature ranging from 5 to 25° C. controlled using temperature regulation,
   ii) maintaining of the homogeneous dispersion obtained during step i) in at least one set of stationary heating conditions ranging from 80 to 100° C., for a period of time of from 1 to 100 hours, and without any polymerization of said diluent b).

8. The process according to claim 7, wherein at the end of step ii), the maximum penetration value of the paste formed is less than 15 mm measured according to standard ASTM D 217.

9. A reactive-binder composition, comprising as rheology additive at least one composition as defined according to claim 1.

10. The reactive-binder composition according to claim 9, which is a polymerizable composition selected from the group consisting of coating compositions, adhesive and glue compositions, moulding compositions, composite material compositions, mastic compositions, chemical anchor bolt compositions, sealant compositions, and photocrosslinkable compositions for stereolithography and for 3D printing of objects.

11. The binder composition according to claim 9 which is crosslinkable by radical route, either under radiation, or by an initiating system based on peroxide or hydroperoxide.

12. The binder composition according to claim 10, which is polymerizable under radiation selected from UV, laser, LED and electron beam.

13. The binder composition according to claim 9 wherein said monofunctional (meth)acrylic reactive diluent b) is a monoacrylate.

14. The binder composition according to claim 13, which is polymerizable by means of a Michael addition reaction with an amine.

15. The binder composition according to claim 9 which is crosslinkable and comprises a two-component system based on epoxy resin and on an amine curing agent.

16. The binder composition according to claim 9 comprising as reactive diluent of said binder composition, at least one acrylic oligomer and/or at least one acrylic monomer.

17. The binder composition according to claim 9 wherein the content by weight of said composition ranges from 0.5% to 10% by weight relative to said reactive-binder composition.

* * * * *